United States Patent
Stefansky (12) 
(10) Patent No.: US 6,295,185 B1
(45) Date of Patent: Sep. 25, 2001

(54) DISC DRIVE SUSPENSION HAVING A MOVING COIL OR MOVING MAGNET MICROACTUATOR

(75) Inventor: Frederick M. Stefansky, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/274,693

(22) Filed: Mar. 23, 1999

Related U.S. Application Data (60) Provisional application No. 60/081,055, filed on Apr. 7, 1998.

(51) Int. Cl.[7] ............................... G11B 5/54; G11B 5/58; G11B 21/10
(52) U.S. Cl. ........................... 360/294.5; 360/264.5; 360/294.6
(58) Field of Search .............................. 360/78.05, 78.12, 360/264.5, 264.7, 294, 294.1, 294.3, 294.5, 294.6

(56) References Cited

U.S. PATENT DOCUMENTS

| | | | |
|---|---|---|---|
| 5,867,347 | * | 2/1999 | Knight et al. ............ 360/294.5 |
| 5,936,805 | * | 8/1999 | Imaino ..................... 360/294.5 |

\* cited by examiner

*Primary Examiner*—David L. Ometz
(74) *Attorney, Agent, or Firm*—Westman, Champlin & Kelly, P.A.

(57) ABSTRACT

A suspension includes a load beam having a main body and a transducer support element which is movable relative to the main body. A sheet of dielectric material extends along the load beam and carries a plurality of transducer signal traces and a coil. A microactuator is positioned along the load beam and includes a first magnet, the coil and a lever arm. The lever arm is secured to the transducer support element and supports one of the first magnet and the coil. The other of the first magnet and the coil is secured relative to the load beam.

14 Claims, 9 Drawing Sheets

DISC DRIVE SUSPENSION HAVING A MOVING COIL OR MOVING MAGNET MICROACTUATOR

CROSS REFERENCE TO RELATED APPLICATION

This application claims the benefit of U.S. Provisional Application Ser. No. 60/081,055, entitled "MOVING MAGNET OR COIL MICRO-ACTUATOR," filed Apr. 7, 1998.

BACKGROUND OF THE INVENTION

The present invention relates to disc drive data storage systems. More particularly, the present invention relates to a disc drive suspension having a moving coil or moving magnet microactuator.

Disc drive data storage systems use rigid discs which are coated with a magnetizable medium for storage of digital information in a plurality of circular, concentric data tracks. The discs are mounted on a spindle motor which causes the discs to spin and the surfaces of the discs to pass under respective hydrodynamic (e.g. air) bearing disc head sliders. The sliders carry transducers which write information to and read information from the disc surfaces. Each slider is supported by a track accessing arm and a suspension. The track accessing arms move the sliders from track to track across the surfaces of the discs under control of electronic circuitry.

The suspension connects the track accessing arm to the slider. The suspension includes a load beam and a flexure. The load beam provides a preload force which forces the slider toward the disc surface. The preload force is generated by forming a preload bend in the load beam, which becomes elastically deformed when the track accessing arm, suspension and slider are loaded into the disc drive. The preload bend is typically positioned near the proximal end of the load beam, adjacent to the track accessing arm. The load beam has a comparatively rigid portion which transfers the preload force from the elastically deformed preload bend to the slider. The rigid portion is typically made by forming stiffening webs or flanges along the longitudinal edges of the load beam.

The flexure is typically a separate piece part that is welded to the load beam. The flexure is flexible in the slider pitch and roll directions to allow the slider to follow the disc topography. The separate flexure is usually formed from a thinner material than the load beam to increase its pitch and roll compliance. Alternatively, the load beam and the flexure may be formed of a single, continuous piece of material.

Microactuators are now being developed for finely adjusting the radial position of the slider relative to the disc surface. There are several types of microactuators, including piezoelectric microactuators and electromagnetic microactuators. In piezoelectric based microactuators, a piezoelectric crystal is mounted on a lever arm which also acts as an electrical ground terminal. The lever arm is formed on or welded to the load beam. This creates a direct path to the electrical ground plane of the suspension. The ground plane of the suspension becomes an active part of the piezoelectric voltage control loop. If the read/write transducers are also connected to the ground plane of the suspension, the control voltage for the piezoelectric crystal may interfere with the sensitive electrical features of transducers.

In some piezoelectric microactuators, the piezoelectric crystal is mounted in a plane perpendicular to the lateral plane of motion of the suspension. This out-of-plane position makes the piezoelectric crystal sensitive to lateral motions of the suspension, which can cause possible resonating of the piezoelectric crystal. This can turn the piezoelectric crystal into a noise generator in the transducer positioning control loop. Further, with piezoelectric microactuators, there is a constraining relationship between the natural resonant frequency of the piezoelectric crystal and the range of motion achieved by the microactuator. A shorter piezoelectric crystal has a higher natural frequency but a smaller range of motion. A longer piezoelectric crystal has a lower natural resonant frequency and a larger range of motion.

Piezoelectric crystals also have a relatively short working life, are susceptible to cracking and are sensitive to damage from assembly or over extension. A further difficulty with piezoelectric microactuators is that the piezoelectric crystals require a high voltage, in the range of 36–100 volts, which is normally not available in a disc drive.

Electromagnetic microactuators generate magnetic fields that, when placed close to the read/write transducers, can interfere with the magnetic fields used to read information from and write information to the disc surface. The magnetic fields generated by electromagnetic microactuators can also corrupt the data stored on the disc surface.

Improved microactuator structures are desired.

SUMMARY OF THE INVENTION

The suspension of the present invention includes a load beam having a main body and a transducer support element which is movable relative to the main body. A sheet of dielectric material extends along the load beam and carries a coil and a plurality of transducer signal traces. A microactuator is positioned along the load beam and includes a first magnet, the coil and a lever arm. The lever arm is secured to the transducer support element and supports one of the first magnet and the coil. The other of the first magnet and the coil is secured relative to the load beam.

In one embodiment, the microactuator is a moving coil microactuator, with the coil being secured to the lever arm and the first magnet being secured relative to the load beam. A top plate is attached to the load beam and forms a cavity between the top plate and the load beam. The first magnet is attached to the top plate, within the cavity. The coil is attached to the lever arm, within the cavity, and is arranged adjacent to and spaced from the first magnet.

In another embodiment, the microactuator is a moving magnet microactuator, with the first magnet being secured to the lever arm and the coil being secured relative to the load beam. The load beam has a lower, disc facing surface and an opposite, upper surface. The lever arm is positioned adjacent the upper surface of the load beam, and the first magnet is attached to the lever arm, between the lever arm and the load beam. The coil is attached to the upper surface of the load beam and faces the first magnet.

Another aspect of the present invention relates to a suspension for supporting a transducer in a disc drive. The suspension includes a load beam having a main body portion and a transducer support portion which is attached to the main body portion through a flexural pivot. A sheet of dielectric material extends along the load beam and carries a plurality of transducer signal traces and a coil. A microactuator is positioned along the load beam and includes a first magnet, the coil and a lever arm. The lever arm has a distal end secured to the transducer support element and a proximal end secured to one of the first magnet and the coil. The other of the first magnet and the coil is secured relative to the load beam.

Yet another aspect of the present invention relates to a disc drive which includes a data storage disc and an actuator for positioning a transducer relative to the data storage disc and for carrying signals to and from the transducer.

DETAILED DESCRIPTION OF THE PREFERRED EMBODIMENTS

Figure 1:
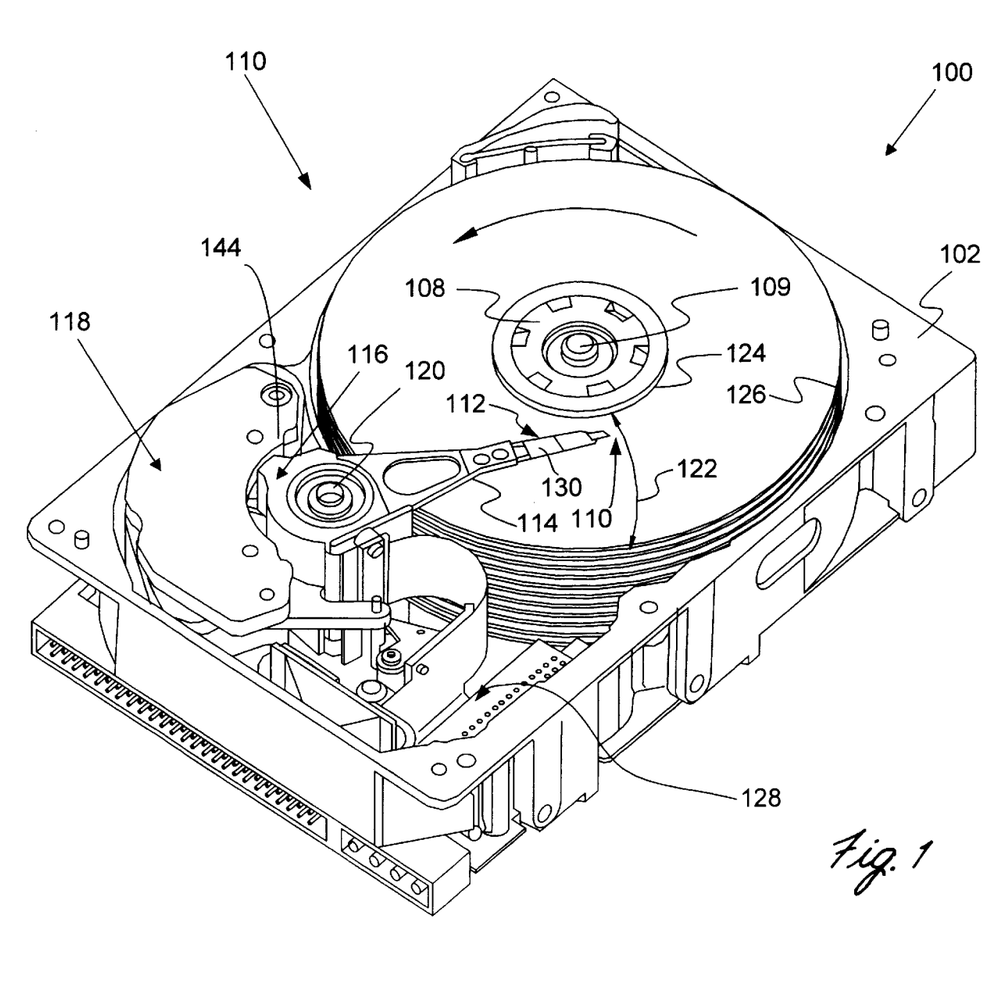
FIG. 1 is a top plan view of a disc drive data storage device according to one embodiment of the present invention.

FIG. 1 is a perspective view of a disc drive 100 according to one embodiment of the present invention. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs which are mounted for co-rotation about central axis 109. Each disc surface has an associated head 110 which is mounted to disc drive 100 for communication with the disc surface. In the example shown in FIG. 1, heads 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track in an off-track direction along an arcuate path 122 between a disc inner diameter 124 and a disc outer diameter 126. Voice coil motor 118 operates under control of internal circuitry 128. Voice coil motor 118 provides "course" positioning of heads 110. Each suspension 112 also has a moving coil or moving magnet microactuator 130 which provides "fine" positioning of heads 110 along path 122.

Write circuitry within internal circuitry 128 encodes the data to be stored into successive code words and sends the code words in the form of a serial analog write signal to the write transducer on head 110 which encodes magnetic flux reversals within a magnetic layer on the disc surface. During read operations, the read transducer in head 110 senses the magnetic flux reversals and generates a serial analog read signal. The analog read signal is converted into a serial digital signal, which is provided to detector and decoder circuitry within internal circuitry 128 to produce a recovered data signal.

Figure 2:
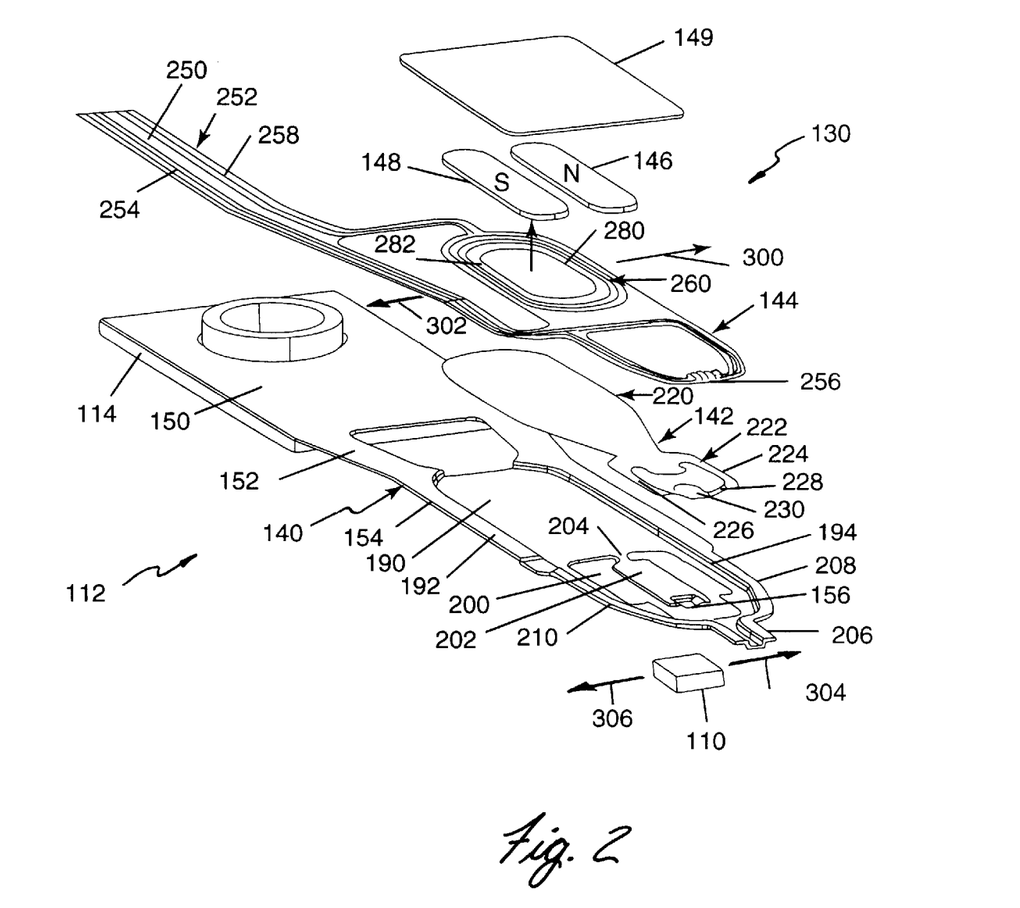
FIG. 2 is an exploded, perspective view of a suspension within the disc drive shown in FIG. 1, according to one embodiment of the present invention.

FIG. 2 is an exploded, perspective view of suspension 112, according to one embodiment of the present invention. Suspension 112 includes load beam 140, flexure/lever arm 142, flexible circuit 144, magnets 146 and 148 and top plate 149. Load beam 140 supplies a preload force to head 110 which forces head 110 toward the disc surface. Load beam 140 includes proximal mounting section 150, flexible beam section 152 and rigid section 154. Proximal mounting section 150 is mounted to track accessing arm 114. The preload force is generated by forming a preload bend in flexible beam section 152, which becomes elastically deformed when suspension 112 is loaded into the disc drive.

Rigid section 154 transfers the preload force from the elastically deformed preload bend to the upper surface of head 110 through a load button 156. Rigid section 154 has a generally "clam shell" shape with a recessed central area 190, an outer rim 192 and a rib 194 which extends from outer rim 192 to central area 190 and generally surrounds area 190. Area 190 lies in a plane which is generally parallel to and offset from a plane defined by outer rim 192.

Load beams of the prior art typically include stiffening webs or flanges along the outer edge of the load beam to provide stiffness. In the embodiment shown in FIG. 2, rib 194 provides out-of-plane bending stiffness to load beam 140 for transferring the preload force from flexible beam section 152 to load button 156 and provides in-plane stiffness to load beam 140 for preventing microactuator 130 from acting on the main body of the load beam.

Load beam 140 further includes an aperture 200 in recessed area 190 which is positioned near the distal end of the load beam and defines a transducer support tongue 202. Tongue 202 is pivotally attached to the main body of load beam 140 through a flexural "pivot" or "hinge" 204. Pivot 204 supports tongue 202 while allowing the tongue to rotate laterally relative to the main body of load beam 140, within aperture 200. Load button 156 is bent out-of-plane toward the disc surface with respect to tongue 202 and provides a point or surface about which head 110 can pitch and roll while following the topography of the disc. In alternative embodiments, load button 204 can be formed as a stamped dimple in tongue 202 or as a raised feature on the lower surface of the tongue through known lithography processes.

Load beam 140 is an example of a ramp load-unload type suspension having a distal tip 206 for engaging a ramp (not shown) positioned at the outer diameter of the disc. The ramp lifts distal tip 206 to unload head 110 from the disc surface during start and stop of disc rotation. Distal tip 162 is supported by a pair of rigid load beam arms 208 and 210 which aperture 200. In non-ramp load applications, distal tip 206 and arms 208 and 210 would be removed.

Flexure 142 is coupled between load beam 140 and head 110 to provide pitch and roll flexibility for head 110 about load button 156. Flexure 142 also provides a lever arm for microactuator 130. Flexure 142 includes proximal section 220 and distal section 222. Proximal section 220 extends rearward along load beam 140, into recessed central area 190, and is laterally movable within recessed area 190. Distal section 222 includes a pair of laterally spaced gimbal arms 224 and 226 which are connected at their distal ends to a cross beam 228. A slider mounting tab 230 extends rearward from cross beam 228, between gimbal arms 224 and 226 for attaching to the upper surface of head 110. Cross beam 228 and slider mounting tab 230 are bent out-of-plane from the remainder of flexure 142, toward head 110. During assembly, the upper surface of slider mounting tab 230 is welded or otherwise fixedly attached to the lower surface of load button 204 such that the remainder of flexure 142 is adjacent the upper surface of load beam tongue 202. The lower surface of slider mounting tab 230 is adhered to the upper surface of head 110. Flexure 142 is otherwise free of a fixed connection to load beam 140.

Flexible circuit 144 includes a sheet of dielectric material 250 and a conductive layer, such as copper, in which a plurality of signal traces 252 are etched. The conductive layer can be located on the upper or lower side of dielectric sheet 250. A first set of conductive traces 254 form the read and write signal lines for the transducer carried by head 110. Transducer read/write traces 254 extend along load beam 140 and terminate at a plurality of bond pads 256 which are bonded to corresponding bond pads (not shown) on the upper surface of head 110.

A second set of conductive traces 258 are electrically coupled to a coil 260 which is also etched in the conductive layer of flexible circuit 144. Coil 260 has a plurality of parallel turns which lie in a plane generally parallel to the plane defined by load beam 140 such that coil 260 has a central axis which is normal to load beam 140.

Coil 260 and the read and write signal traces are embedded in the same flexible circuit. Coil 260 is added to flexible circuit 144 using existing manufacturing processes. Unlike piezoelectric microactuators, coil 260 does not require electrical termination on suspension 112 because the leads of coil 260 (conductive traces 258) are also etched into flexible circuit 144. This simplifies the assembly process.

Flexible circuit 144 can further include an additional coil (not shown) located on the lower surface of dielectric sheet 250. The second coil can be connected to the first coil and with conductive traces 258 with a conventional via which is known to those skilled in the art of flexible circuit design. This increases the number of turns in the combined coil.

Flexible circuit 144 is attached to the upper surface of flexure 142 about coil 260 using a thin dry adhesive which also acts as an electrical insulator between the coils and flexure 142. The proximal section 220 of flexure 142 provides in-plane stiffness for coils 260.

In an alternative embodiment, flexible circuit 144 and flexure 142 are fabricated together from a multi-layered laminate structure which includes a conductive layer, a dielectric layer and a stainless steel layer. The conductive layer can include copper, for example, and the dielectric layer can include polyamide, for example. Conductive traces 254 and 258 and coil 260 are etched in the copper layer, and flexure 142 is etched in the stainless steel layer, leaving the polyamide layer in between. The polyamide layer can be contoured as desired using photoresist processes. This embodiment does not require additional adhesives because flexible circuit 144 and flexure 142 are fabricated from a laminate, which is formed into any desirable shape and then welded at slider mounting tab 230 to tongue 202. This eliminates possible adhesive contamination.

Magnets 146 and 148 are attached to the lower surface of top plate 149 and are arranged to have anti-parallel magnetic polarities. For example, magnet 146 has a first magnetic pole, such as a "south" pole, which is aligned to face a first leg 280 of coil 260. Magnet 148 has a second magnetic pole, such as a "north" pole, which is aligned to face a second, opposite leg 282 of coil 260.

Top plate 149 and load beam 140 enclose coil 260 and magnets 146 and 148 within a cavity between top plate 149 and load beam 140. When assembled, magnets 146 and 148 are located directly above legs 280 and 282 of coil 260 with a small gap separating the magnets from the coil. This is known as a two-pole voice coil motor. Both legs 280 and 282 are used to produce electromotive force. A spacer such as that shown in the embodiment of FIG. 9, can be used between coil 260 and magnets 146 and 148 to maintain the desired gap while permitting lateral motion of coil 260.

Magnets 146 and 148 can be formed of conventional magnetic materials, such as iron-chromium-cobalt, which can be rolled to a thickness between 0.002 inches to 0.015 inches. In one embodiment, magnets 146 and 148 have thickness less than 0.006 inches. Magnets 146 and 148 can be etched, cut or sheared to their final shape. Plated magnetic material can also be used and may have a thickness of up to about 0.001 inches, for example.

In one embodiment, load beam 140 is formed of a magnetically permeable material such that load beam 140 forms part of a return path for magnetic flux generated by magnets 146 and 148. The lateral edges of top plate 149 are attached to the outer rim 192 of load beam 140, thereby closing a magnet circuit between top plate 149 and load beam 140. Previous load beams are typically made out of a 300 series stainless steel which is not a conductor of magnet flux. Several materials can used for load beam 140 instead of a 300 series stainless steel. For example, load beam 140 can be made of a 17-4 series stainless steel which is a very good conductor of magnetic flux, while maintaining other desirable material properties for load beam 140.

By incorporating load beam 140 into the return path of the magnetic circuit, load beam 140 keeps magnetic fields generated by magnets 146 and 148 from affecting the data stored in a layer of magnetic material on the disc surface. Even a small magnetic field can erase this data. Magnets 146 and 148 are permanent magnets which produce high magnetic fields that are capable of corrupting the data on the disc surface.

In the embodiment shown in FIG. 2, magnets 146 and 148 are attached to top plate 149 which is located on the other side of load beam 140 relative to the disc surface. Load beam 140 and top plate 149 shield the disc surface from the magnetic fields generated by magnets 146 and 148. Flux leakage in this area does not affect data on the disc surface because load beam 140 is located between the disc surface and magnets 146 and 148 and serves as a secondary return path for the magnetic flux. Top plate 149 serves as a primary return path for the magnetic flux. Stray magnetic fields are further diminished as they pass through the air gap between magnets 146 and 148 and load beam 140, which is able to contain the stray magnetic fields. A third magnetic flux path is created along outer rim 192 of load beam 140, which further minimizes flux leakage. The more flux that is directed into coil 260, the more powerful the voice coil motor will be. In the embodiment shown in FIG. 5, use of magnets with higher flux densities is possible since the clam shape of load beam 140 and its magnetically permeable properties effectively control flux leakage.

During operation, a microactuator control circuit (not shown) generates a current through coil 260 at a selected amplitude and polarity. Interaction between the magnetic fields generated by magnets 146 and 148 and the magnetic fields generated as a result of charge flowing through legs 280 and 282 of coil 260 produce an electromotive force. In the moving coil embodiment shown in FIG. 2, the electromotive force acts on coil 260, forcing the coil and thus the proximal section 220 of flexure 142 in direction 300 or 302 depending upon the direction of current flowing through the coil. By adjusting the magnitude and direction of current flowing through coil 260, the magnitude and direction at which proximal section 220 moves relative to load beam 140 can be adjusted.

Lateral movement of proximal section 220 is translated into arcuate rotational motion by flexural pivot 204. Since coil 260 is located on an opposite side of pivot 204 than tongue 202, movement of coil 260 in direction 300 or 302 causes pivot 204 to distort and bend, which forces tongue 202 to move in the opposite direction. Movement of tongue 202 results in arcuate displacement of head 110 in the direction indicated by arrows 304 and 306. The clam shell shape of load beam 140 provides a stiff structure which keeps the magnetic fields from pulling load beam 140 with flexure/lever arm 142.

In one embodiment, movement of head 110 is in the range of 0.0001 inches in each of the directions 304 and 306 and has very little resistance. A visco-elastic material can be used between coil 260 and magnets 146 and 148 to reduce friction and provide damping. Memory of flexural pivot 204 gives microactuator 130 a neutral position from which head 110 can be actuated in either direction 304 or 306 by simply applying a current of a varied amount across coil 260 of one polarity or another. Through this displacement, fine head positioning is accomplished by microactuator 130.

An advantage of suspension 112 is that all of the components of microactuator 130 are in the plane of lateral motion encountered during seek operations, which reduces the sensitivity of the microactuator to these lateral motions. This raises the natural frequency of microactuator 130 and allows the electronic controls to operate in a higher frequency bandwidth. A higher frequency bandwidth enables higher bit densities on the disc surface. Unlike a piezoelectric microactuator, the natural frequency of microactuator 130 is not directly related to its range of motion. Therefore, higher frequencies can be achieved without sacrificing range of motion. Microactuator 130 is also very rugged and is able to withstand over-extension, shocks and mishandling far better than suspensions having piezoelectric microactuators. Another advantage of suspension 112 is that microactuator 130 uses no more than 100 milliamps of current at 5–10 volts, which is readily available in a disc drive. The microactuator therefore does not require a larger power supply.

Figure 3:
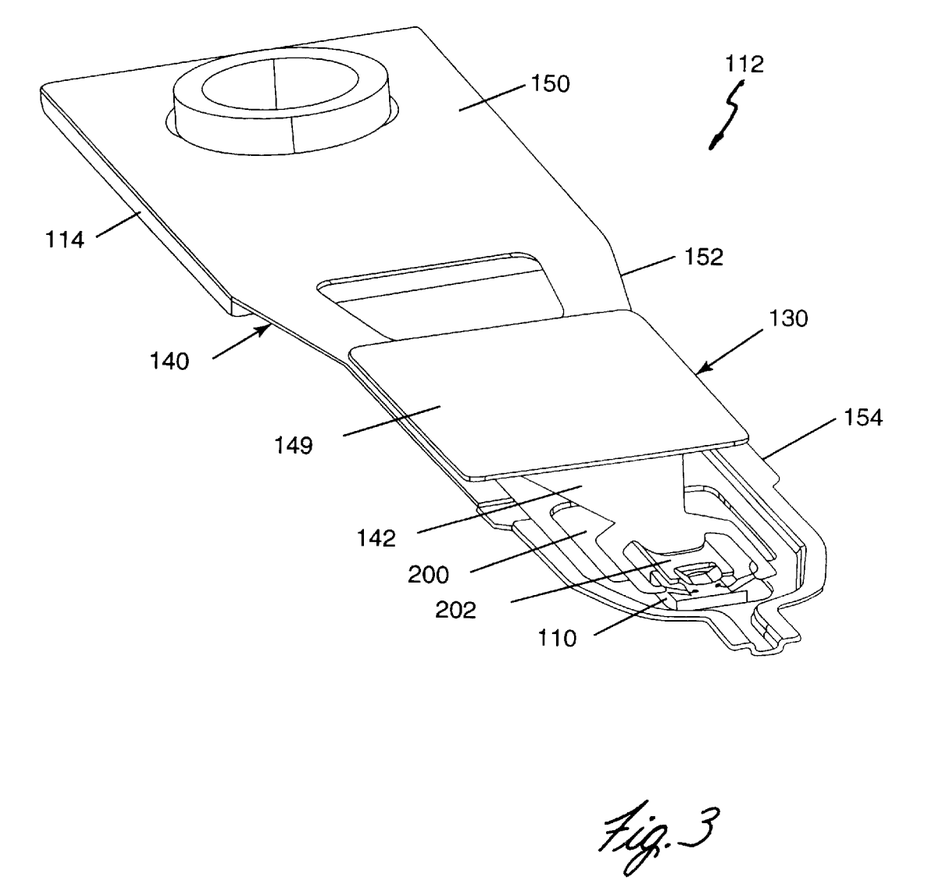
FIG. 3 is a top, perspective view of the suspension shown in FIG. 2 in an assembled state with its flexible cable removed for clarity.
Figure 4:
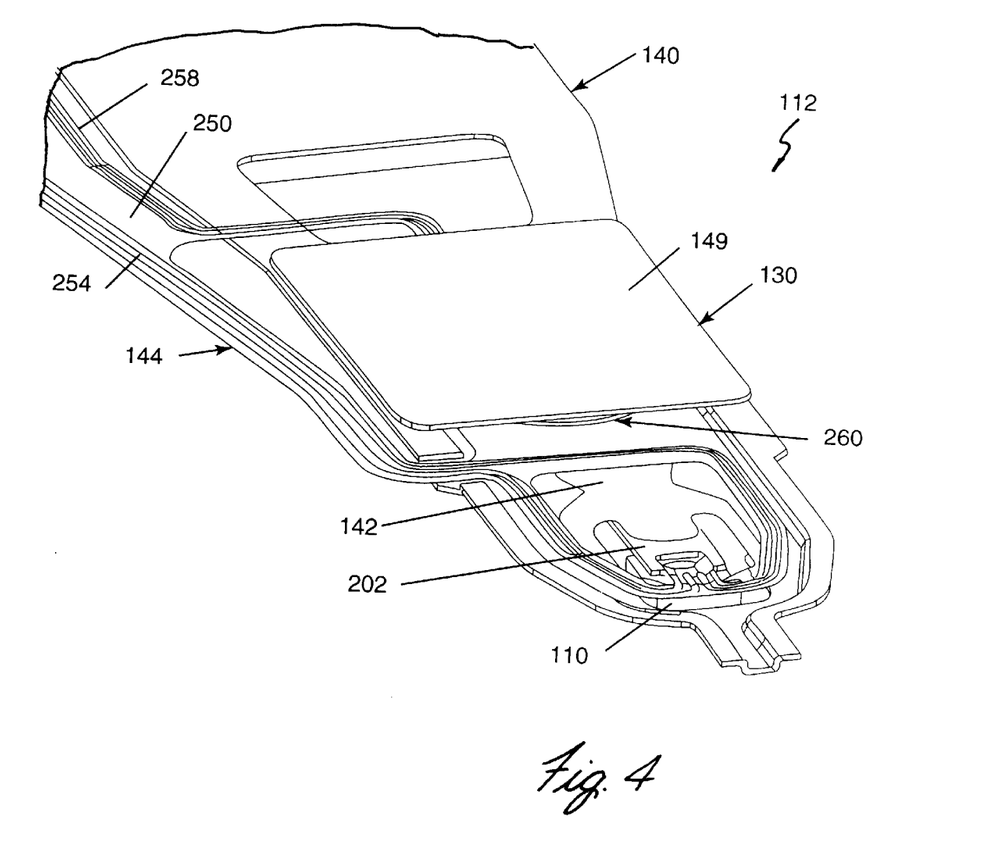
FIG. 4 is a top, perspective view of the suspension which is similar to FIG. 3 but further includes the flexible circuit.
Figure 5:
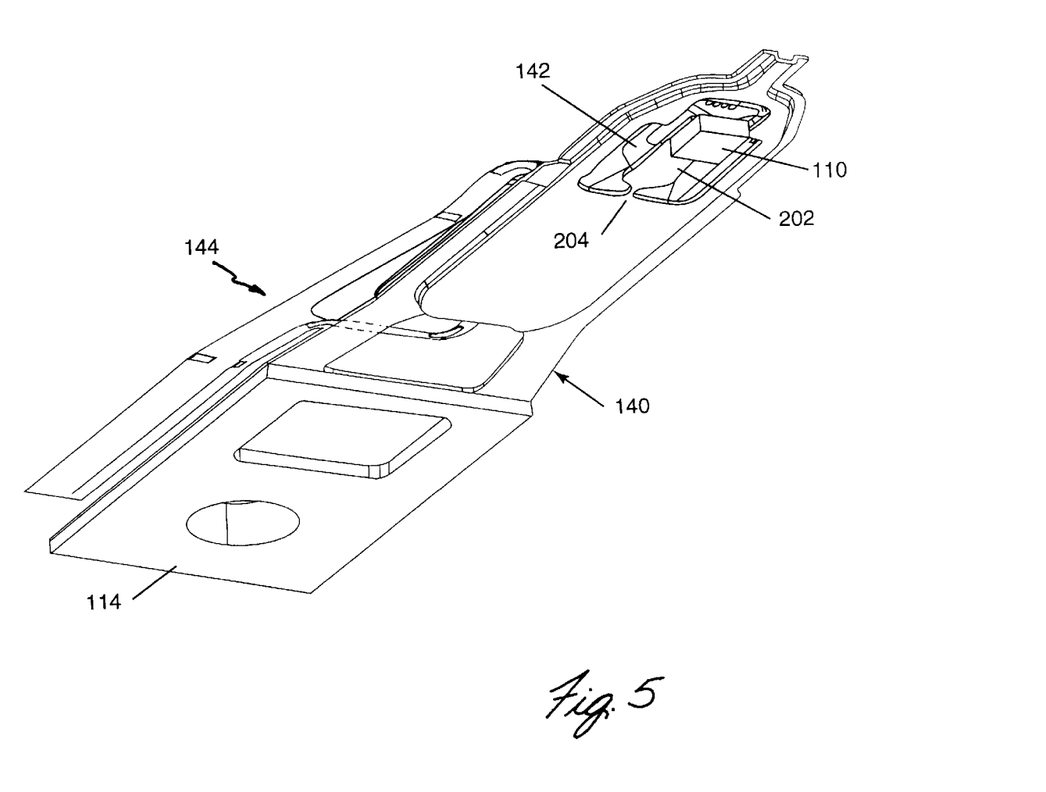
FIG. 5 is a bottom, perspective view of the suspension shown in FIGS. 2–4, as viewed from the disc surface.

FIGS. 3–5 show suspension 112 in an assembled state. FIG. 3 is a top, perspective view of suspension 112 with flexible cable 144 removed for clarity. FIG. 4 is a top, perspective view of suspension 112 which is similar to FIG. 3 but further includes flexible circuit 144. FIG. 5 is a bottom, perspective view of suspension 112, as viewed from the disc surface.

Figure 6:
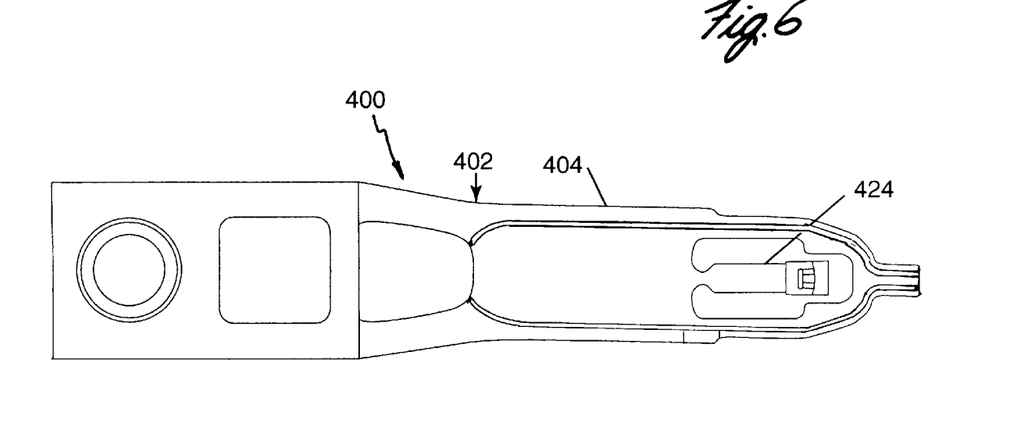
FIG. 6 is a top plan view of a suspension according to an alternative embodiment of the present invention.

FIG. 6 is a top plan view of a suspension 400 according to an alternative embodiment of the present invention. Suspension 400 is similar to suspension 112 (shown in FIGS. 1–5), but has a load beam 402 with an extended rigid section 404.

Figure 7:
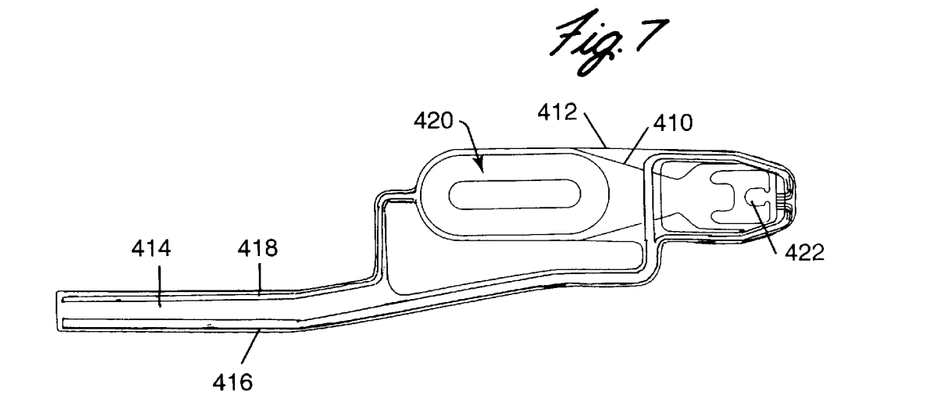
FIG. 7 is a top plan view of a flexure and a flexible circuit for mounting to the suspension shown in FIG. 6.

FIG. 7 is a top plan view of a flexure 410 and an attached flexible circuit 412 for mounting to suspension 400. Flexure 410 is similar to flexure 142, and flexible circuit 412 is similar to flexible circuit 144 shown in FIGS. 2–5. Flexible circuit 412 includes dielectric sheet 414, read/write transducer traces 416, coil traces 418 and coil 420. Flexure 410 has a head mounting tab 422 which is welded to transducer support tongue 424 of load beam 402 (shown in FIG. 6).

Figure 8:
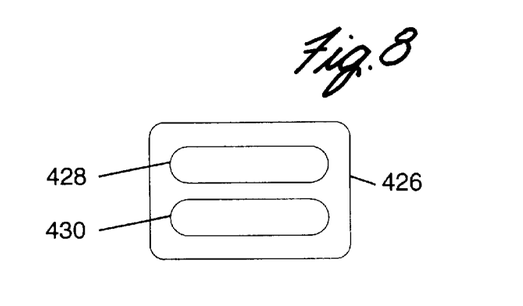
FIG. 8 is a bottom plan view of a top plate and magnets for mounting to the suspension shown in FIG. 6.

FIG. 8 is a bottom plan view of a top plate 426 and magnets 4.28 and 430 for use with the suspension shown in FIG. 6. Magnets 428 and 430 are attached to top plate 426, and top plate 426 is then mounted to rigid section 404 of load beam 402 (shown in FIG. 6) such that magnets 428 and 430 face coil 420 (shown in FIG. 7). The suspension components shown in FIGS. 6–8 operate similar to the components shown in the previous figures.

Figure 9:
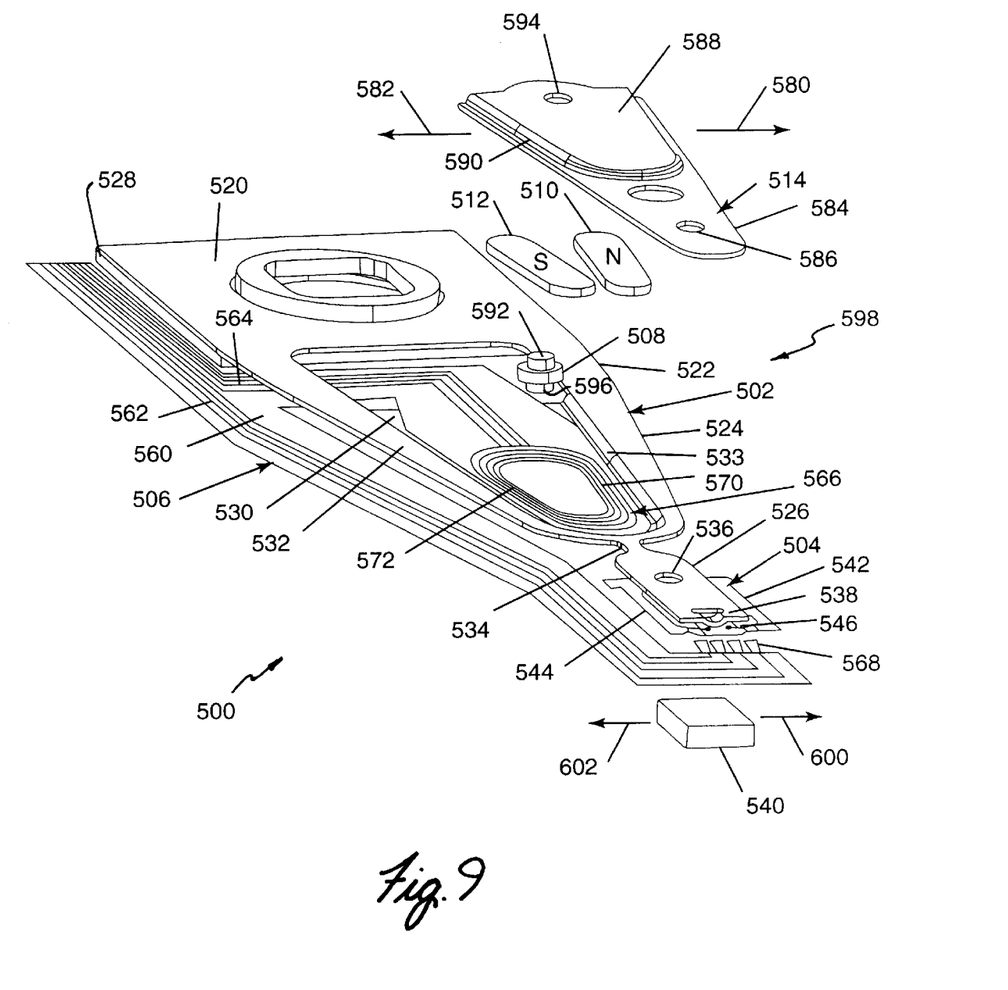
FIG. 9 is a perspective, exploded view of a suspension having a moving magnet microactuator according to an alternative embodiment of the present invention.
Figure 10:
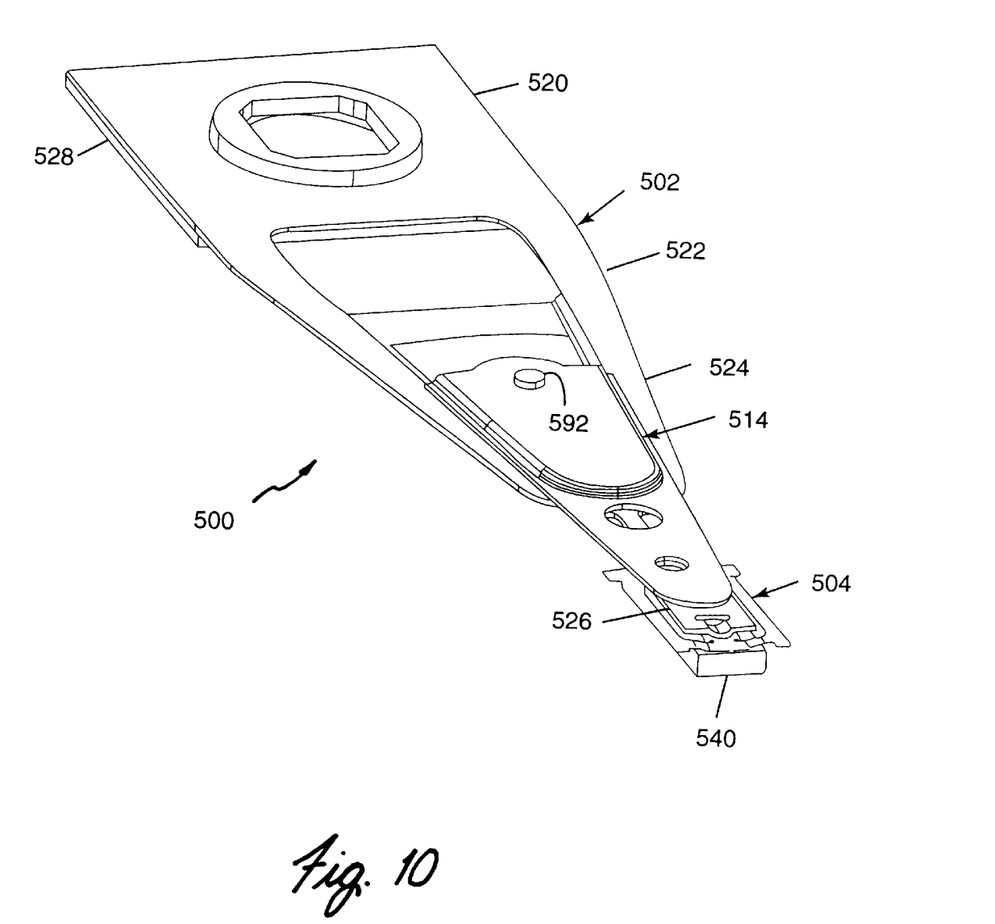
FIG. 10 is a top, perspective view of the suspension shown in FIG. 9 in an assembled state with a flexible circuit removed for clarity.
Figure 11:
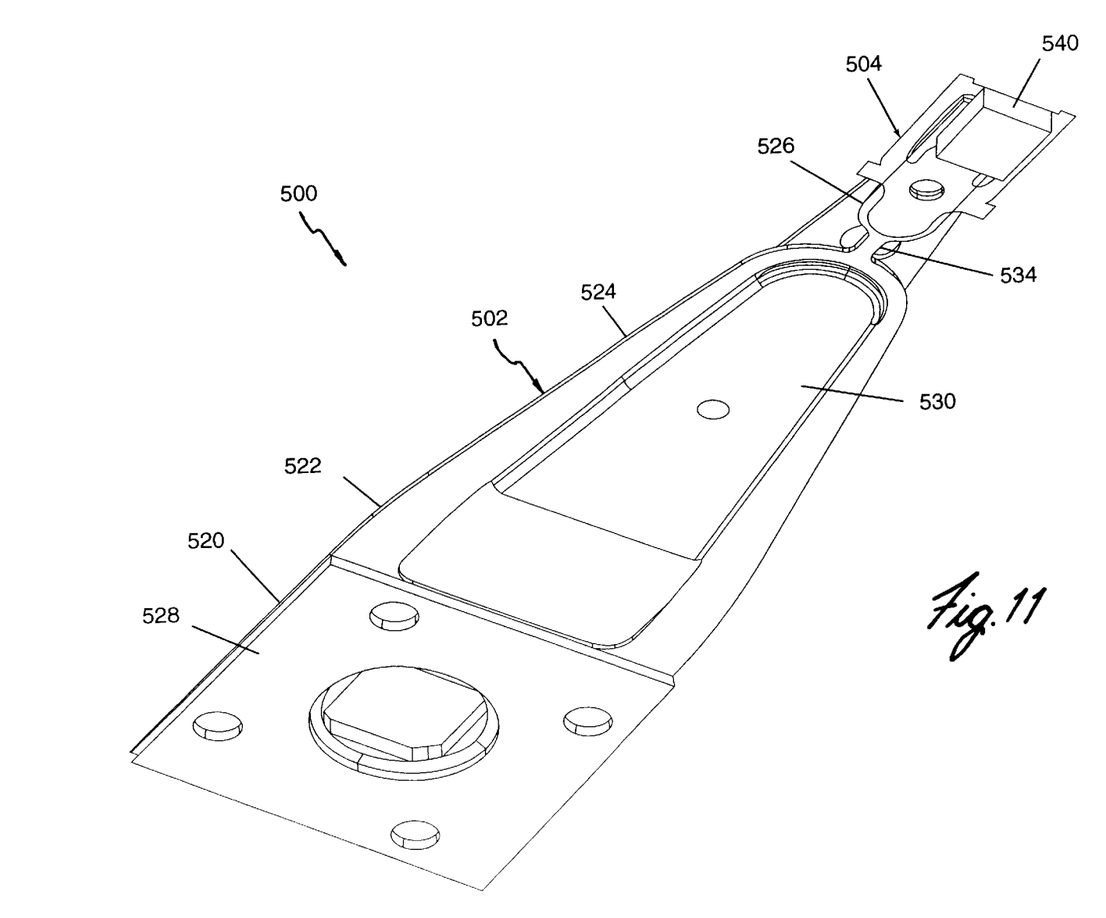
FIG. 11 is a bottom, perspective view of the suspension shown in FIG. 9 in an assembled state, also with the flexible circuit removed.

FIG. 9 is a perspective, exploded view of a suspension 500 having a moving magnet microactuator, as opposed to a moving coil microactuator, according to another alternative embodiment of the present invention. FIG. 10 is a top, perspective view of suspension 500 in an assembled state with flexible circuit 506 removed for clarity. FIG. 11 is a bottom, perspective view of suspension 500, also with flexible circuit 506 removed.

Suspension 500 includes load beam 502, flexure 504, flexible circuit 506, spacer 508, magnets 510 and 512 and lever arm 514. Load beam 502 has a proximal mounting section 520, a flexible beam section 522, a rigid section 524 and a transducer support section 526. Proximal mounting section 520 is attached to track accessing arm 528. Flexible beam section 522 has a preload bend which provides a preload force to transducer support section 526.

Rigid section 524 transfer the preload force from flexible beam section 522 to transducer support section 526. Rigid section 524 has a "clam shell" shape with a recessed area 530, a raised outer rim 532 and a rib 533 which extends from raised outer rim 532 to recessed area 530.

Transducer support section 526 is in the form of a cantilevered tongue and is attached to rigid section 524 through a flexural pivot or hinge 534. Transducer support section 526 has a load point button or dimple 538 which defines the point at which load beam 502 provides the preload force to the upper surface of flexure 504 and head 540. Transducer support section 526 also has an alignment aperture 536 for aligning corresponding alignment features on flexure 504 and lever arm 514 during assembly.

Flexure 504 is welded to the lower surface of transducer support section 526 of load beam 502. Flexure 504 has a pair of gimbal arms 542 and 544 and a head mounting tab 546 for supporting head 540. Head 540 is adhered to the lower surface of head mounting tab 546, for example.

Flexible circuit 506 includes a sheet of dielectric material 560 on which a first set of conductive traces 562, a second set of conductive traces 564 and a coil 566 are etched. Conductive traces 562 form read/write transducer leads which terminate with a plurality of bond pads 568 for electrically coupling to corresponding bond pads (not shown) on the upper surface of head 540. Conductive traces 564 are electrically coupled to coil 566. Coil 566 is similar to coil 260 (shown in FIG. 2), but is secured relative to load beam 502. For example, the flexible circuit 560 on which coil 566 is etched may be adhered to recessed area 530 of load beam 502. Coil 566 has opposing legs 570 and 572 which interact with magnets 510 and 512, respectively.

Magnets 510 and 512 are secured to the lower surface of lever arm 514, which is moveable relative to load beam 502 in directions 580 and 582. Lever arm 514 has a distal section 584 which is welded to the upper surface of transducer support section 526 of load beam 502, on the other side of flexural pivot 534. Lever arm 514 is otherwise free of a fixed connection with load beam 502. Distal section 584 includes an alignment aperture 586 which is aligned with aperture 536 of transducer support section 526. Lever arm 514 also has a "clam shell" shape with a raised area 588 and an outer rim 590. Raised area 588 and outer rim 590 are parallel to one another and to recessed area 530 and outer rim 532 of load beam 502.

Magnets 510 and 512 are attached to the lower surface of area 588. Spacer 508 has a raised feature 592 which mates with aperture 594 in area 588 of lever arm 514. Spacer 592 has a lower surface 596 which rests on coil 566. Spacer 508 maintains a desired gap between coil 566 and magnets 510 and 512 while permitting lateral movement of lever arm 514 in the direction of arrows 580 and 582 relative to load beam 502. Spacer 508 can include a visco-elastic material to provide damping between lever arm 514 and load beam 502.

Coil 566, spacer 508, magnets 510 and 512 and lever arm 514 together form a moving magnet microactuator 598. Once again, all components of microactuator 598 lie in planes parallel to the plane of suspension 500, thus reducing sensitivity of the microactuator to lateral, in-plane motions of suspension 500.

During operation, the lateral position of lever arm 514 is adjusted by applying a current of a selected magnitude and polarity through coil 566 in the presence of the magnetic fields generated by magnets 510 and 512. This creates a lateral electromotive force on magnets 510 and 512 which moves the proximal end of lever arm 514 in the direction of arrows 580 and 582. Flexural pivot 534 translates movement of lever arm 514 into an opposite movement of transducer support section 526. Movement of transducer support section 526 relative to the main body of load beam 502 results in microactuation of head 540 in an off-track direction indicated by arrows 600 and 602.

As in the embodiments shown in FIGS. 2–8, load beam 502 and lever arm 514 are formed of magnetically permeable materials which diminish stray magnetic fields that could otherwise interfere with the read and write operation of head 540 or the data stored on the surface of the disc. Coil 566 and its conductive leads 564 are fabricated on the same flexible circuit as the leads 562 for the read/write transducer. This simplifies the assembly process and improves the reliability of suspension 500. In an alternative embodiment, flexible circuit 506 is fabricated with load beam 502 from a multi-layered laminate.

Although the present invention has been described with reference to preferred embodiments, workers skilled in the art will recognize that changes may be made in form and detail without departing from the spirit and scope of the invention. For example, the positions of the coil and magnets can be reversed to form a moving-coil microactuator or a moving-magnet microactuator as desired. Also, the load beam can have a variety of shapes and can be a separate piece part from the flexure or be integrated with the flexure as a single continuous piece of material. The moving portion of the microactuator can act on a movable portion of the load beam, as in the above examples, or can act directly on a movable portion of the flexure. Other modifications can also be made.

What is claimed is:

1. A suspension for supporting a transducer in a disc drive, the suspension comprising:
    a load beam having a main body;
    a transducer support element which is pivotally coupled to the main body through a flexural pivot;
    a sheet of dielectric material extending along the load beam;
    a plurality of conductive transducer signal traces which are carried by the sheet;
    a coil which is carried by the sheet;
    a lever arm extending along the load beam and secured to the transducer support element on a first side of the flexural pivot; and
    a microactuator coupled between the lever arm and the load beam on a second, opposite side of the flexural pivot and comprising a moving microactuator member and a stationary microactuator member, wherein the lever arm supports the moving microactuator member and the stationary microactuator member is secured relative to the load beam, and wherein each of the moving microactuator member and the stationary microactuator member comprises a respective one of a first magnet and the coil.

2. The suspension of claim 1 wherein the microactuator is a moving coil microactuator, with the coil being secured to the lever arm and the first magnet being secured relative to the load beam.

3. The suspension of claim 2 and further comprising:
    a top plate which is attached to the load beam and forms a cavity between the top plate and the load beam;
    wherein the first magnet is attached to the top plate within the cavity and is thereby secured relative to the load beam; and
    wherein the coil is attached to the lever arm within the cavity and is arranged adjacent to and spaced from the first magnet.

4. The suspension of claim 3 wherein:
    the load beam has a lower, disc facing surface and an opposite, upper surface;
    the top plate is attached to the upper surface of the load beam; and
    the load beam and the top plate are magnetically permeable and form part of a magnetic flux return path for the first magnet.

5. The suspension of claim 3 wherein:
    the microactuator further comprises a second magnet which is attached to the top plate and spaced laterally from the first magnet;
    the coil comprises a first leg of conductive traces and a second, opposite leg of conductive traces;
    the first magnet has a first magnetic pole which faces the first leg of traces; and
    the second magnet has a second magnetic pole, opposite to the first magnetic pole, which faces the second leg of traces.

6. The suspension of claim 2 and further comprising a flexure having a transducer mounting tab for supporting the transducer, wherein the flexure and the lever arm are formed of a single, continuous piece of material.

7. The suspension of claim 1 wherein the microactuator is a moving magnet microactuator, with the first magnet being secured to the lever arm and the coil being secured relative to the load beam.

8. The suspension of claim 7 wherein:
    the load beam comprises a lower, disc facing surface and an opposite, upper surface;
    the lever arm is positioned adjacent the upper surface;
    the first magnet is attached to the lever arm, between the lever arm and the load beam; and
    the coil is attached to the upper surface of the load beam and faces the first magnet.

9. The suspension of claim 8 wherein:
the load beam and the lever arm are magnetically permeable and form part of magnetic flux return path for the first magnet.

10. The suspension of claim 8 wherein:
the microactuator further comprises a second magnet which is attached to the lever arm, between the lever arm and the load beam;
the coil comprises a first leg of conductive traces and a second, opposite leg of conductive traces;
the first magnet has a first magnetic pole which faces the first leg of conductive traces; and
the second magnet has a second magnetic pole, opposite to the first magnetic pole, which faces the second leg of conductive traces.

11. The suspension of claim 8 and further comprising a flexure which is secured to the transducer support element.

12. The suspension of claim 1 and further comprising a spacer positioned between the coil and the first magnet, which defines a gap between the first magnet and the coil.

13. The suspension of claim 1 wherein:
the main body of the load beam comprises a proximal mounting section, a resilient beam section and a rigid section, wherein the rigid section comprises an outer rim, a central area which is recessed from and parallel to the outer rim, and a rib which extends from the outer rim to the central area; and
the coil, the first magnet and the lever arm lie in planes generally parallel to the outer rim and the central area.

14. A suspension for supporting a transducer in a disc drive, the suspension comprising:
a load beam having a main body portion and a transducer support portion which is attached to the main body portion through a flexural pivot;
a sheet of dielectric material which extends along the load beam and carries a plurality of transducer signal traces and a coil; and
a microactuator positioned along the load beam and comprising a lever arm, a moving microactuator member and a stationary microactuator member, wherein the lever arm has a distal end secured to the transducer support portion on a first side of the flexural pivot and a proximal end secured to the moving microactuator member on a second, opposite side of the flexural pivot, wherein the stationary microactuator member is secured relative to the load beam, and wherein each of the moving microactuator member and the stationary microactuator member comprises a respective one of a magnet and the coil.

* * * * *